United States Patent [19]

Mogamiya et al.

[11] Patent Number: 5,438,381
[45] Date of Patent: * Aug. 1, 1995

[54] DEVICE FOR DRIVING PHOTOGRAPHING LENS AND FINDER DEVICE OF CAMERA HAVING ZOOM LENS

[75] Inventors: Makoto Mogamiya; Tahei Morisawa, both of Tokyo, Japan

[73] Assignee: Asahi Kogaku Kogyo Kabushiki Kaisha, Tokyo, Japan

[ * ] Notice: The portion of the term of this patent subsequent to Nov. 26, 2008 has been disclaimed.

[21] Appl. No.: 217,765

[22] Filed: Mar. 25, 1994

Related U.S. Application Data

[63] Continuation of Ser. No. 15,074, Feb. 8, 1993, abandoned, which is a continuation of Ser. No. 750,266, Aug. 27, 1991, abandoned, which is a continuation of Ser. No. 414,123, Sep. 27, 1989, Pat. No. 5,068,678.

[30] Foreign Application Priority Data

Sep. 29, 1988 [JP] Japan .................. 63-127923

[51] Int. Cl.⁶ .................... G03B 3/00; G03B 13/10
[52] U.S. Cl. ................................ 354/199; 354/222
[58] Field of Search ............... 354/199, 195.1, 149.11, 354/222

[56] References Cited

U.S. PATENT DOCUMENTS

| | | | |
|---|---|---|---|
| 3,002,422 | 10/1961 | Lohmeyer | 354/199 X |
| 4,072,971 | 2/1978 | Kuboshima | 354/199 X |
| 4,589,023 | 5/1986 | Suzuki et al. | 358/213 |
| 4,768,048 | 8/1988 | Wakabayashi | 354/222 X |
| 4,944,030 | 7/1990 | Haraguchi et al. | 354/199 X |
| 4,951,074 | 8/1990 | Ueda | 354/199 X |

FOREIGN PATENT DOCUMENTS

WO8707038  2/1987  WIPO .

OTHER PUBLICATIONS

United Kingdom Search Report, Short Dec. 20, 1989.

*Primary Examiner*—Howard B. Blankenship
*Assistant Examiner*—J. K. Han
*Attorney, Agent, or Firm*—Sandler, Greenblum & Bernstein

[57] ABSTRACT

A zoom lens camera having a zoom photographing lens and a zoom finder device are driven in association with each other so that the image plane and the finder field of view correspond to each other. A pair of pinions for the zoom photographing lens and the zoom finder device are provided in a gear train and are driven by a reversible motor so that the zoom photographing lens and the zoom finder device are driven by the respective pinions.

17 Claims, 5 Drawing Sheets

DEVICE FOR DRIVING PHOTOGRAPHING LENS AND FINDER DEVICE OF CAMERA HAVING ZOOM LENS

This application is a continuation, of application Ser. No. 08/015,074, filed Feb. 8,1993, now abandoned, which is a continuation of 07/750,266, filed Aug. 27, 1991, now abandoned, which is a continuation of 07/414,123, filed Sep. 27, 1989, which issued as Pat. No. 5,068,678 on Nov. 26, 1991.

BACKGROUND OF THE INVENTION

1. Field of the Invention

The present invention relates to a device for driving a photographing lens and a finder device of a zoom lens camera having a photographing lens system and a finder optical system which are arranged separately from each other. The present invention further relates to a device for adjusting the assembly of the photographing lens and the finder device.

2Description of Related Art

In zoom lens cameras of the type having a photographing lens system and a finder optical system which are arranged separately from each other, it is common practice to make the image plane (focal length) of the zoom photographing lens correspond to the finder field of view of the zoom finder device. For this purpose, the movable lenses that constitute the zoom finder device are moved in association with the zooming operation of the photographing lens. However, the conventional connecting (or association) mechanisms are generally arranged such that the movement of a cam ring for the photographing lens is transmitted to the movable lenses of the zoom finder device through interconnecting members such as a cam plate, and therefore the structure becomes complicated. It is also troublesome and difficult to adjust the assembly of the zoom photographing lens and the zoom finder device so that these two devices will be effectively driven in association with each other.

SUMMARY OF THE INVENTION

In view of the above-described problems of the prior art, it is a primary object of the present invention to provide a driving device which is capable of driving the zoom photographing lens and the zoom finder device in association with each other with a simplified structure.

It is another object of the present invention to provide a driving device which facilitates the adjustment of the relationship between the zoom photographing lens and the zoom finder device.

According to the present invention, the zoom photographing lens and the zoom finder device are driven without such an interlocked relationship that either one of the two is driven in response to the movement of the other.

For this purpose, the present invention employs a pair of pinions which are provided in a gear train driven by a reversible motor to drive the zoom photographing lens and the zoom finder device, respectively.

The arrangement that the zoom photographing lens and the zoom finder device are individually driven simplifies the association mechanism becoming complicated.

If a cam ring which effects zooming by rotation is provided on the zoom photographing lens and a gear which meshes with the pinion for the zoom photographing lens is provided on this cam ring, it is possible to drive the zoom photographing lens by the rotation of the pinion.

If a finder cam member which changes the finder field of view is provided on the zoom finder device and a gear which meshes with the pinion for the zoom finder device is provided on this finder cam member, it is possible to drive the zoom finder device through the rotation of the pinion. The finder cam member may be constituted by a cam ring similar to that for the photographing lens. It is also possible to constitute the finder cam member by use of a finder cam plate which has a vertical rack. More specifically, the arrangement may be such that a vertical rack is formed on the finder cam plate and the pinion for the zoom finder device meshes with the rack.

If the gear which is meshes with the pinion for the zoom photographing lens and tile cam ring are secured in such a manner that the angular position of the gear relative to the cam ring is adjustable, it is possible to readily obtain synchronization between tile zoom photographing lens and the zoom finder device.

BRIEF DESCRIPTION OF THE DRAWINGS

The accompanying drawings show in combination one embodiment of the present invention, in which.

DETAILED DESCRIPTION

Figure 1:
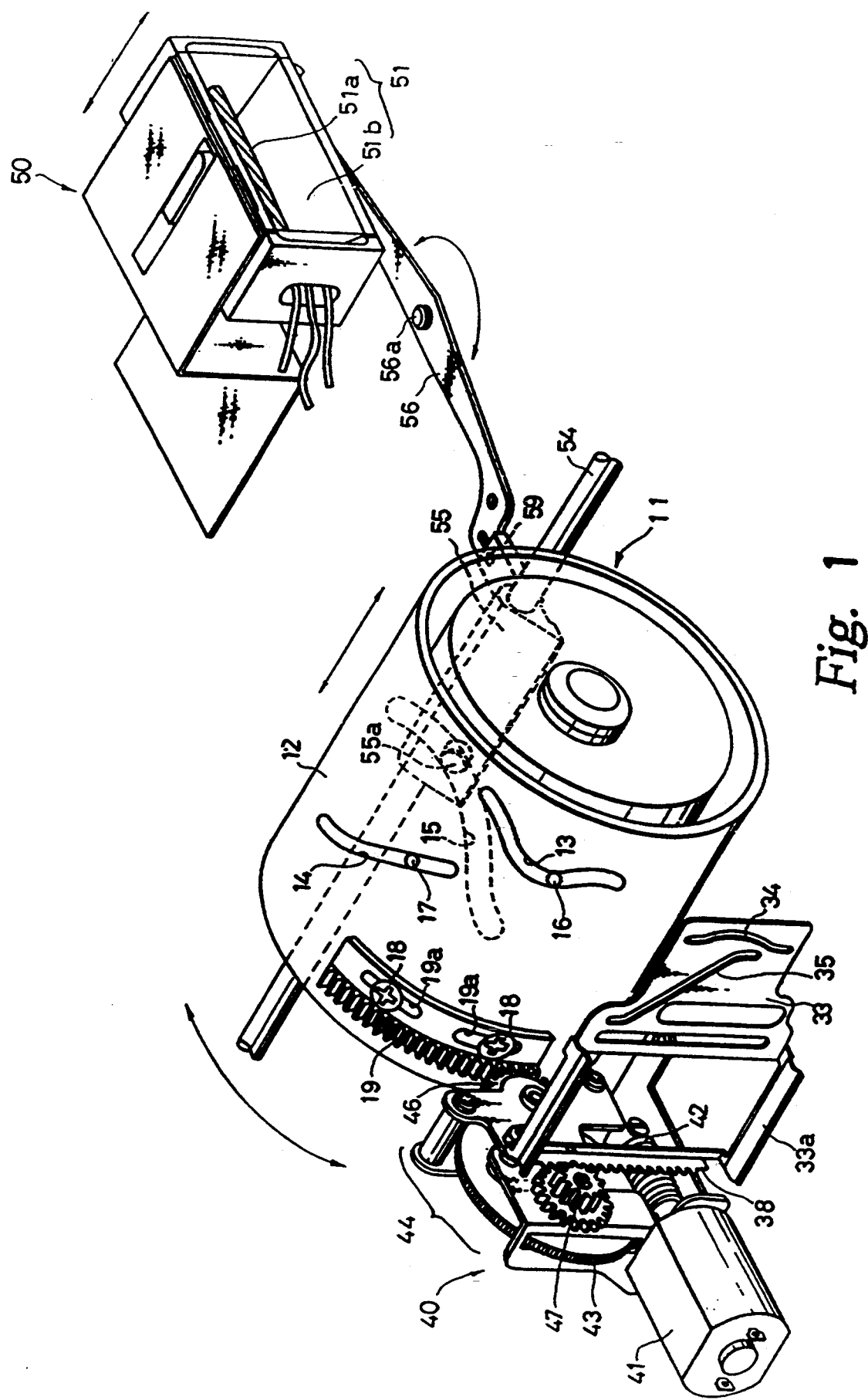
FIG. 1 is a perspective view illustrating main components of the embodiment with the zoom finder device removed.

The present invention will be described below in detail by way of one embodiment and with reference to the accompanying drawings. A zoom photographing lens 11 has a cam ring 12 on the outer periphery thereof. The cam ring 12 is formed with zooming cam grooves 13 and 14 for movable lenses and a cam groove 15 for moving the strobe device. In the zooming cam grooves 13 and 14 are fitted guide pins 16 and 17 which are integrally provided on front and rear lens groups (not shown), respectively. The cam ring 12 has a sector gear 19 secured to the outer periphery thereof through set-screws 18. The sector gear 19 has circumferential slots (or elongated bores) 19a, so that the angular position of the sector gear 19 relative to the cam ring 12 is adjustable within the range of the effective length of the slots 19a.

Figure 3:
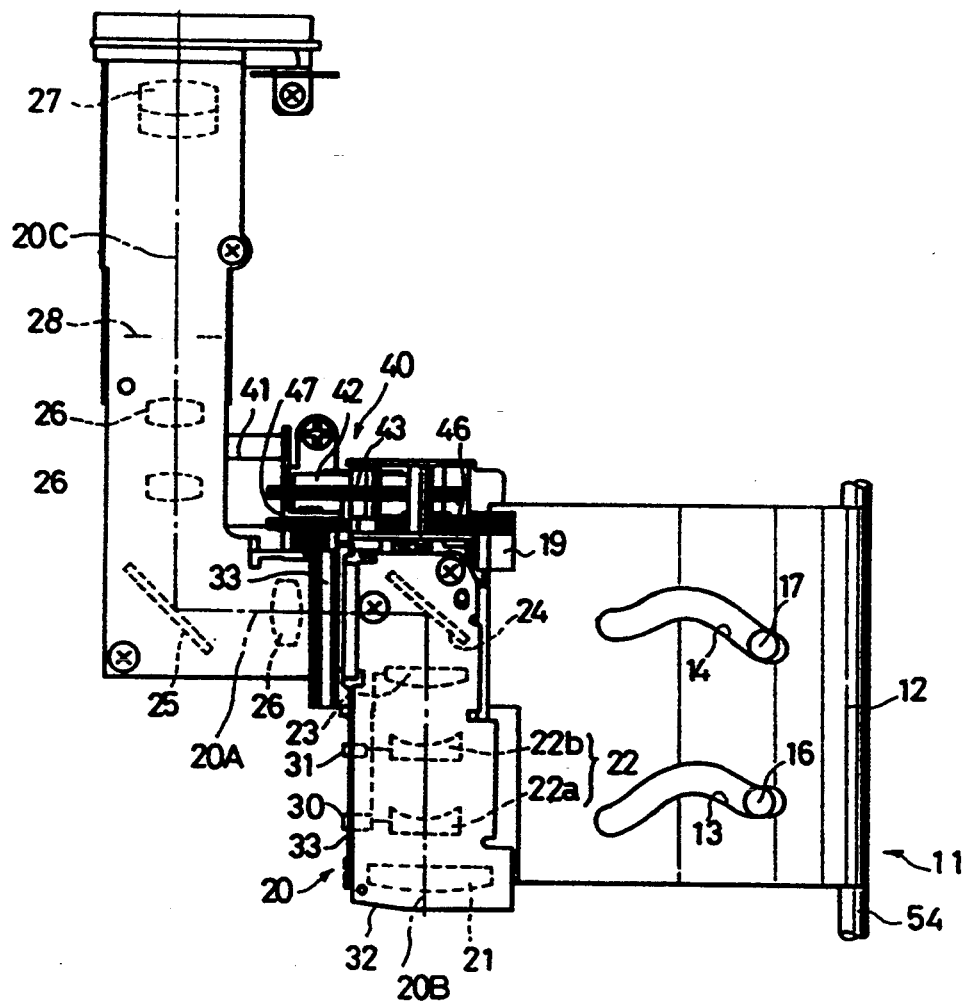
FIG. 3 is a plan view illustrating the zoom photographing lens and the zoom finder device.

A zoom finder device 20 is disposed at one side of the zoom photographing lens 11. The optical path of the zoom finder device 20 is bent in a crank-like shape in plan view in order to bring it as close to the zoom photographing lens 11 as possible to thereby minimize the parallax and to ensure a space at the rear of the zoom photographing lens 11. More specifically, as shown in FIG. 3, the zoom finder device 20 has an optical path 20A which is orthogonal to the optical axis of the photographing lens 11 and optical paths 20B and and 20C which extend from the two ends of path 20A in opposite directions and which are parallel to the optical axis of the photographing lens 11. Thus the zoom finder device 20 has a crank-shaped planar configuration.

The optical system of the zoom finder device 20 comprises an objective lens 21, a combination of movable lenses (variable power lenses) 22 (22a and 22b) which are movable together as a unit, a movable lens (variable power lens) 23, reflecting mirrors 24, 25, a relay lens 26 and an eyepiece lens 27. Thus, an aerial image formed by the objective lens 21 and the movable lenses 22 and 23 is observed after being changed to a correct image through the reflecting mirrors 24, 25, the relay lens 26 and the eyepiece lens 27. The reference numeral 28 denotes a field frame.

The movable lenses 22 and 23 are each moved along a predetermined track to change the finder field of view. Driving pins 30 and 31 are provided on the respective supporting members (movable lens frames) for the movable lenses 22 and 23. The driving pins 30 and 31 extend through the casing 32 of the zoom finder device 20 to fit in zooming cam grooves 34 and 35, respectively, which are provided in a finder cam plate 33.

The finder cam plate 33 has at its rear end a rectangular portion 33a which surrounds the bent portion 32a (i.e., the orthogonal optical path 20A) of the casing 32, and a vertical rack 38 is formed on the rear end portion of the rectangular portion 33a.

Figure 4:
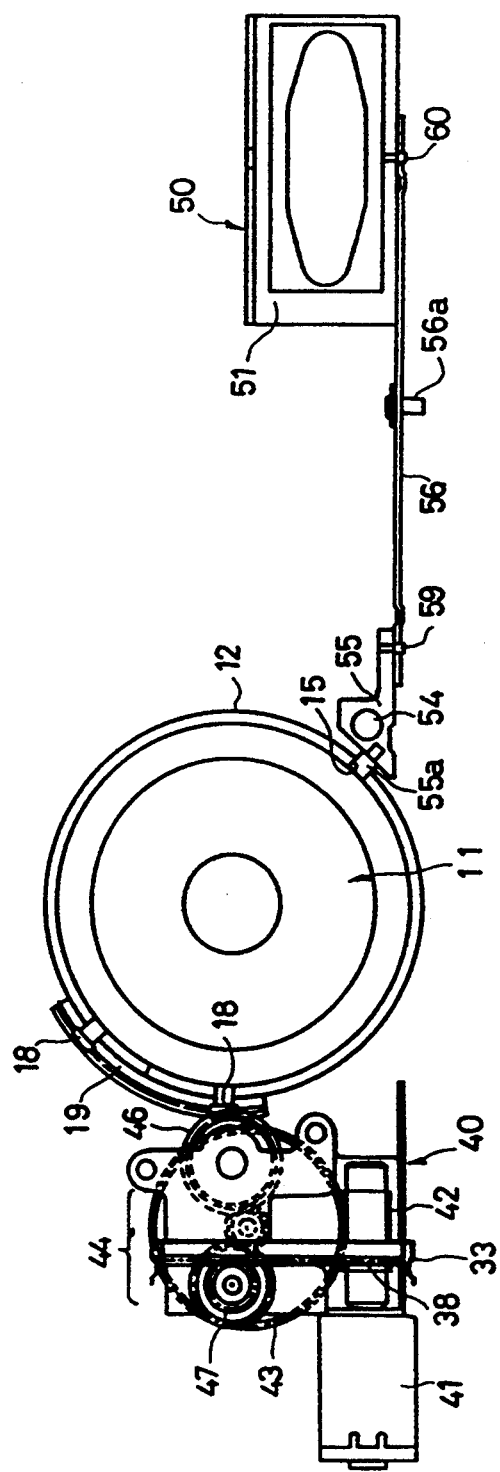
FIGS. 4 and 5 are front and plan views, respectively, illustrating the embodiment with the zoom finder device removed.
Figure 5:
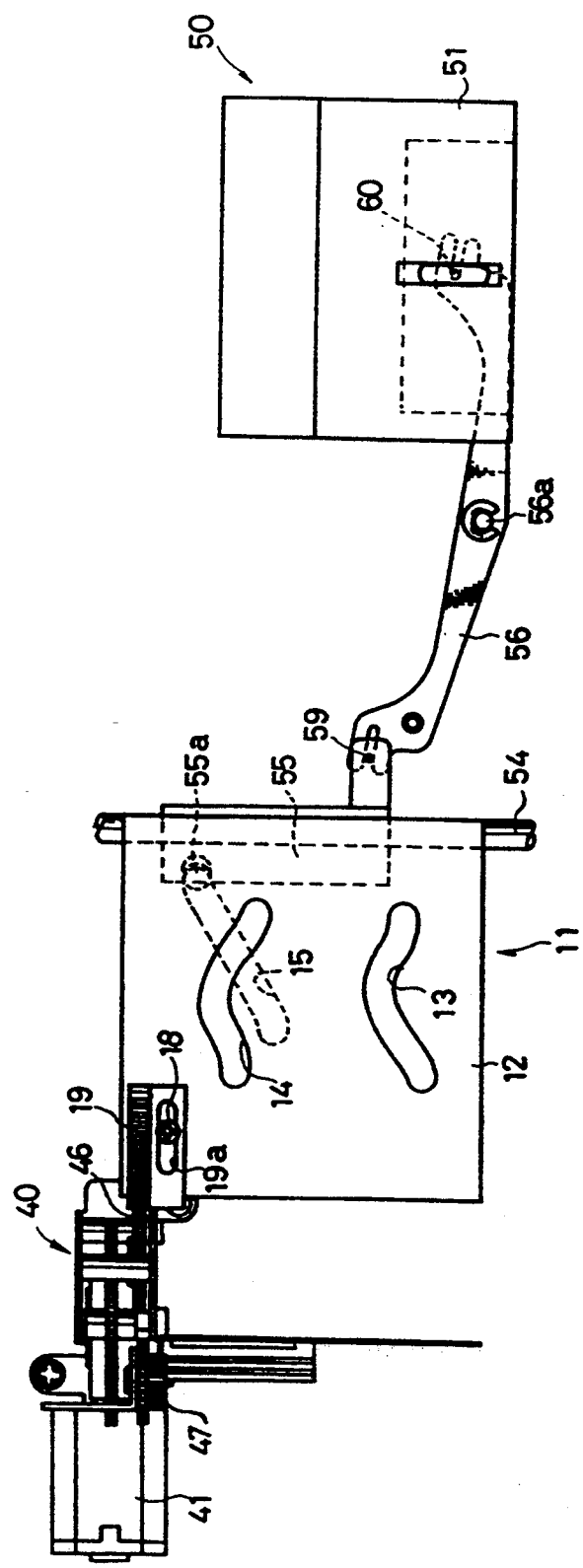

A driving unit 40 is secured to the rear end of the bent portion 32a of the casing 32. The driving unit 40 is arranged such that the rotation of a reversible motor 41 is transmitted to a pair of pinions 46 and 47 through a worm 42, a worm wheel 43 and a gear train 44 which is in mesh with the worm wheel 43. The pinion 46 is in mesh with the sector gear 19 on the cam ring 12, while the pinion 47 is in mesh with the rack 38 on the Finder cam plate 33. As shown in FIGS. 4 and 5, a common first gear train includes reversible motor 41 worm wheel 43 and gear train 44. A second gear train includes pinion 46 and sector gear 19. A third gear train include pinion 47 and rack 38. The second and third gear trains separately engage the common first gear train and the second and third gear trains contain no common elements.

Accordingly, as the reversible motor 41 is driven forward or backward, the pinions 46 and 47 rotate simultaneously and the rotation of the pinion 46 causes the cam ring 12 to rotate through the sector gear 19. As the cam ring 12 rotates forward or backward, the front and rear lens groups move along the optical axis by the action of the zooming cam grooves 13 and 14 while changing the distance (air gap) there between, thus effecting zooming of the zoom photographing lens.

Meanwhile, as the pinion 47 rotates forward or backward, the finder cam plate 33 moves vertically and this causes the movable lenses 22 and 23 to move along the optical axis by the zooming cam grooves 34 and 35, thus effecting zooming of the zoom finder device 20. By individually driving the zoom photographing lens 11 and the zoom finder device 20 in this way, it is possible to obtain a driving device which needs no interlocking member between the zoom photographing lens 11 and the zoom finder device 20.

The zoom photographing lens 11 and the zoom finder device 20 are adjusted so that the image plane of the zoom photographing lens 11 is substantially identical to the finder field of view of the zoom finder device 20. According to the present invention, the adjustment of the assembly of the zoom photographing lens 11 and the zoom finder device 20 can be effected by adjusting the angular position of the sector gear 19 relative to the cam ring 12 within the effective length of the slots 19a; therefore, the adjusting operation is extremely easy. More specifically, after the driving unit 40, the zoom finder device 20 and the zoom photographing lens 11 have been roughly assembled, the positional relationship between the driving unit 40 and the zoom finder device 20 is first fixed and then the angular position of the sector gear 19 relative to the cam ring 12 is determined while checking the relationship between the finder field of view (i.e., focal length) of the zoom finder device 20 and the size of the image plane (i.e., focal length) of the zoom photographing lens 11', thereafter the setscrews 18 are tightened. By so doing, synchronization between the zoom finder device 20 and the zoom photographing lens 11 can be obtained with ease.

Figure 2:
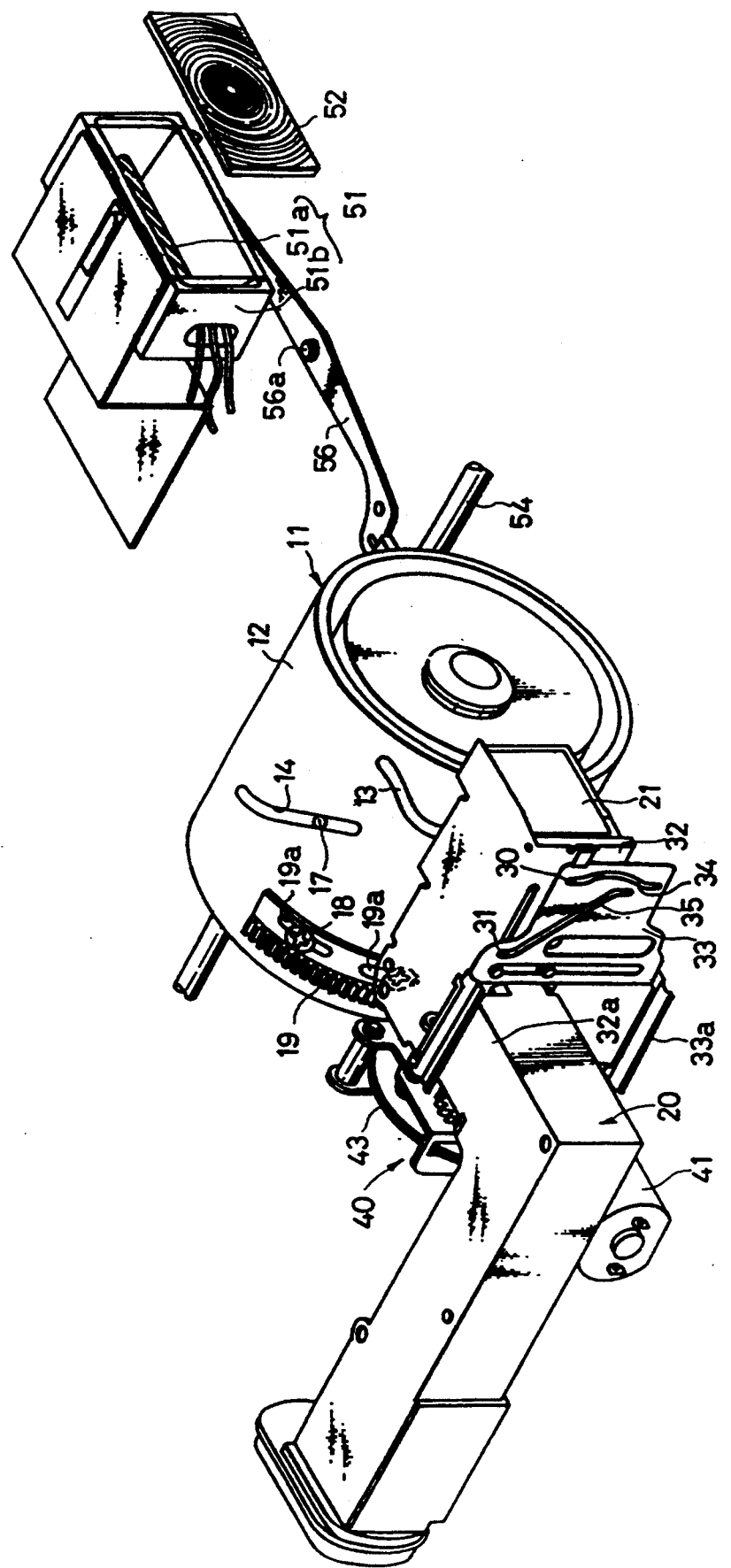
FIG. 2 is a perspective view illustrating the general arrangement of the embodiment.

The camera of the illustrated embodiment further has a variable illumination angle strobe device 50 which is provided on that side of the zoom photographing lens 11 which is remote from the zoom finder device 20. The strobe device 50 is designed to vary the illumination angle in association with the rotation of the cam ring 12. The strobe device 50 has a xenon lamp (light emitting tube) 51a and a reflecting shade 51b which constitute in combination a strobe moving block 51 and a condenser lens (Fresnel lens; see FIG. 2) 52. The strobe moving block 51 is moved relative to the condenser lens 52 to thereby vary the illumination angle.

A guide bar 54 which extends parallel to the optical axis of the zoom photographing lens 11 is fixed below one side of the lens 11. A relay block 55 is movably supported on the guide bar 54. The relay block 55 has a guide pin 55a which is fitted in the strobe moving cam groove 15 provided in the cam ring 12, so that as the cam ring 12 rotates, the relay block 55 moves along the optical axis. The relay block 55 and the strobe moving block 51 of the strobe device 50 are interlocked with each other through an interlocking lever 56 which pivots about a pivot point 56a. More specifically, two ends of the interlocking lever 56 are engaged with interlocking pins 59 and 60, respectively, which are secured to the relay block 55 and the strobe moving block 51, so that the strobe moving block 51 moves along the optical axis through the movement of the relay block 55 along the optical axis caused by the rotation of the cam ring 12 and the pivoting action of the interlocking lever 56. The profile of the strobe moving cam groove 15 and the lengths of the arms of the interlocking lever 56 are determined so that the strobe illumination angle that is determined by the position of the strobe moving block 51 corresponds to the change in the focal length of the zoom photographing lens 11 caused by the rotation of the cam ring 12.

As has been described above, according to the present invention the zoom photographing lens and the zoom finder device are driven without an interlocked relationship wherein either one of the two is driven in response to the movement of the other. Since the zoom photographing lens and the zoom finder device are driven by a pair of pinions, respectively, which are incorporated in a gear train driven by a reversible motor, it is possible to obtain a lens shutter type camera having a zoom lens which operates effectively without complication of the associated relationship between the zoom photographing lens and the zoom finder device. If the pinion for the zoom photographing lens meshes with a gear which is secured to the cam ring and this gear and the cam ring are secured together in such a manner that the angular position of the gear relative to the cam ring is adjustable, It is possible to readily obtain synchronization between the zoom photographing lens and the zoom finder device.

We claim:

1. A zoom lens camera having a zoom-photographing lens and a zoom finder device which are driven in association with each other so that the image plane and the finder field of view correspond to each other, comprising:
   a common first gear train including a reversible motor, for driving both the zoom-photographing lens and the zoom finder device;
   a second gear train including a first pinion for the zoom photographing lens; and
   a third gear train including a second pinion for the zoom finder device;
   wherein each said second and third gear trains separately engage said common first gear train and said second and third gear trains contain no common elements.

2. The zoom lens camera according to claim 1, said third gear train further comprising a cam element for varying the finder field of view, said cam element provided with a toothed member which is engaged with said second pinion.

3. The zoom lens camera according to claim 2, said toothed member comprising a vertical rack which is engaged with said second pinion.

4. The zoom lens camera according to claim 1, said second gear train further comprising a cam ring mounted for rotation, rotation of said cam ring effecting zooming of said photographing lens, said cam ring comprising a toothed segment, the relative angular position of said cam ring and said toothed segment being adjustable.

5. The zoom lens camera according to claim 1, said third gear train further comprising a vertically movable finder cam plate positioned at a side of a finder cam housing and a cam arrangement provided on said cam plate for moving at least one lens of said zoom finder device for zooming of said zoom finder device.

6. A zoom lens camera comprising:
   a translationally immobile drive member;
   a zoom-photographing lens having an optical axis and a zoom finder device which are driven in association with each other so that the image plane and the finder field of view correspond to each other, wherein a gear train for the zoom-photographing lens and a gear train for the zoom finder device are separately engaged with said translationally immobile drive member and are disengageably engaged with said translationally immobile drive member to be driven by a driving force from a single drive source through a common drive train, and said gear train for the zoom-photographing lens lacks any elements which are common with said gear train for the zoom finder device.

7. A zoom lens camera according to claim 6, wherein said gear train for the zoom-photographing lens comprises a first pinion associated with said common drive train, and said second drive train comprises a second pinion associated with said common drive train;
   wherein said common drive train comprises a motor which rotates said first and second pinions for driving the gear trains for the zoom photographing lens and the zoom finder device, respectively.

8. A zoom lens camera according to claim 6, wherein said zoom photographing lens gear train and said zoom finder device gear train are driven in planes not parallel to the optical axis of the zoom photographing lens.

9. The zoom lens camera according to claim 6, said gear train for said zoom-photographing lens and said gear train for the zoom finder device being directly driven from said translationally immobile drive member.

10. A photographic camera having a zoom-photographing lens and a zoom finder device which are driven in association with each other so that the image plane and the finder field of view correspond to each, means for driving said zoom-photographing lens and said zoom finder device, said driving means comprising a common drive unit for driving a drive train for said photographing lens and for driving a drive train for said zoom finder device, said drive train for said zoom-photographing lens and said drive train for said zoom finder device being separately drivingly coupled to said common drive unit, and said drive train for said photographing lens lacking any elements which are common with elements of said drive train for said zoom finder device.

11. The photographic camera according to claim 10, said drive train for said photographing lens comprising a pinion engaging said common drive unit and said drive train for said zoom finder device comprising a pinion engaging said common drive unit.

12. The photographic camera according to claim 11, said drive train for said zoom finder device further comprising a cam element for varying the finder field of view, said cam element provided with a toothed member which is engaged with said pinion of said drive train for said zoom finder device.

13. The photographic camera according to claim 12, said toothed member comprising a vertical rack which is engaged with said pinion of said drive train for said zoom finder device.

14. The photographic camera according to claim 10, said zoom photographing lens drive train comprising a cam ring mounted for rotation, rotation of said cam ring comprising means for effecting zooming of said zoom photographing lens, said cam ring comprising a toothed segment, the relative angular position of said cam ring and said toothed segment being adjustable.

15. The photographic camera according to claim 10, said zoom finder device drive train comprising a vertically movable finder cam plate positioned at a side of a finder housing and a cam arrangement provided on said cam plate for moving at least one lens of said zoom finder device for zooming of said zoom finder device.

16. The photographic camera according to claim 10, said drive train for said photographing lens comprising a pinion engaging said common drive unit and said drive train for said zoom finder device comprising a pinion engaging said common drive unit, each of said pinions being driven by a reversible motor so that said zoom photographic lens and said zoom finder device are driven by said respective pinions through said drive train for the zoom photographic lens and said drive train for the zoom finder device, said drive train for the zoom photographic lens and said drive train for the zoom finder device being separate from one another.

17. The photographic camera according to claim 10, said drive train for said zoom-photographing lens and said drive train for said zoom finder device being directly driven from said single drive unit.

* * * * *